United States Patent
Erickson et al.

(10) Patent No.: US 6,289,508 B1
(45) Date of Patent: Sep. 11, 2001

(54) METHOD AND APPARATUS FOR DYNAMIC OPTIMIZATION

(75) Inventors: Mark A. Erickson, Sunnyvale; Pradeep Pandey, San Jose; Sunil C. Shah, Mountain View; Thorkell Gudmundsson, San Jose, all of CA (US)

(73) Assignee: Voyan Technology, Santa Clara, CA (US)

( * ) Notice: Subject to any disclaimer, the term of this patent is extended or adjusted under 35 U.S.C. 154(b) by 0 days.

(21) Appl. No.: 09/594,462

(22) Filed: Jun. 14, 2000

Related U.S. Application Data

(63) Continuation of application No. 09/121,949, filed on Jul. 24, 1998, which is a continuation-in-part of application No. 08/980,041, filed on Nov. 26, 1997, now Pat. No. 6,041,172.

(51) Int. Cl.[7] .................................................. G06F 9/45
(52) U.S. Cl. ........................................ 717/9; 717/8; 703/6
(58) Field of Search ............................ 717/8, 9, 10; 703/6

(56) References Cited

U.S. PATENT DOCUMENTS

| | | | |
|---|---|---|---|
| 4,599,692 | * 7/1986 | Tan et al. ................................. | 706/12 |
| 4,620,286 | * 10/1986 | Smith et al. ............................ | 706/12 |
| 5,268,835 | 12/1993 | Miyagaki et al. . | |
| 5,424,963 | * 6/1995 | Turner et al. ............................ | 703/6 |
| 5,517,594 | 5/1996 | Shah et al. . | |
| 5,572,627 | * 11/1996 | Brown .................................... | 714/47 |
| 5,579,440 | * 11/1996 | Brown .................................... | 706/14 |
| 5,740,033 | 4/1998 | Wassick et al. . | |
| 5,850,356 | * 12/1998 | Yamada et al. .......................... | 703/6 |
| 5,909,381 | * 1/1999 | Shome et al. ............................. | 703/6 |
| 6,041,141 | * 3/2000 | Yamamoto et al. ................... | 382/231 |
| 6,041,172 | * 12/2000 | Shah et al. ............................... | 703/6 |
| 6,071,317 | * 6/2000 | Nagel ....................................... | 717/4 |
| 6,096,085 | * 8/2000 | Sammelman ............................ | 703/2 |
| 6,167,360 | * 12/2000 | Erickson et al. ......................... | 703/6 |

OTHER PUBLICATIONS

Ganguly et al, "Query optimization for parallel execution", ACM SGIMOD pp. 9–18, Apr. 1992.*
Ozcan et al, "Dynamic query optimization on a distributed object mamagemnt platform", ACM CIKM pp. 117–124, Aug. 1996.*
Visweswariah, "Optimization techniques for high performance digital circuits", IEEE pp. 198–205, Apr. 1992.*
S. Joe Qin & Thomas A. Badgwell, "An Overview of Industrial Model Predictive Control Technology." pgs. 1–31.
Minh S. Le, Taber H. Sith, Duane S. Boning, & Berbert H. Sawin, "Run–to–Run Process Control on a Dual–Coil Transformer Coupled Plasma Etcher with Full Wafer Interferometry and Spatially".
Taber H. Smith, Duane S. Boning, Jerry Stefani & Stephanie Watts Butler, "Run by Run Advanced Process Control of Metal Sputter Deposition," 9 pgs.
George Box & Tim Kramer, "Statistical Process Monitoring & Feedback Adjustment–A Discussion," Aug. 1992, vol. 34, No. 3, pp. 251–267.
Duane Boning, William Moyne, Taber Smith, James Moyne & Arnon Hurwitz, "Practical Issues in Run by Run Process Control," 1995, pp. 1–18.

* cited by examiner

Primary Examiner—Mark Powell
Assistant Examiner—Anil Khatri
(74) Attorney, Agent, or Firm—Blakely, Sokoloff, Taylor & Zafman

(57) ABSTRACT

The present invention is a method and apparatus for dynamic optimization of a dynamic physical system having a device under control and a controller along with a modeling system having an estimator and a constrained nonlinear program. The time varying trajectories of the dynamic physical system are parameterized and run through the modeling system in order to produce a set of optimal time varying setpoint trajectories to be used in the dynamic physical system. The optimal time varying setpoint trajectories optimize the physical system to produce the desired end result (or product) of the dynamic physical system.

61 Claims, 5 Drawing Sheets

METHOD AND APPARATUS FOR DYNAMIC OPTIMIZATION

This is a con of application Ser. No. 09/121,949 filed Jul. 24, 1998 which is a Continuation-in-Part application of application Ser. No. 08/980,041 Filed on Nov. 26, 1997, titled "Multiple Scale Signal Processing and Control System," now issued on Mar. 21, 2000 as U.S. Pat. No. 6,041,172 which is assigned to the assignee herein.

BACKGROUND OF THE INVENTION

1. Field of the Invention

The present invention relates to the field of signal processing and control systems. More particularly, the present invention relates to the dynamic optimization of time varying trajectories to make signal processing and control systems achieve desired outcomes.

2. Background Information

Signal processing and the control of physical systems generally involves obtaining measurements from a physical system in the form of electrical signals and processing the signals in order to bring about a desired result. For example, the control of a physical system typically involves obtaining measurements from the physical system, comparing the measurements with a predetermined control recipe, and adjusting the system inputs, all in real time, in response to the comparison to minimize variations between the measured values and recipe values. During signal processing and control, the signals to be processed or the variables to be controlled are not always directly available for observation and must be inferred from indirect and noisy measurements. The indirect measurements are generally obtained from embedded sensors which contain multiple pieces of information that are dynamically confounded. Extraction of the information of interest requires the use of complex and time consuming calibration procedures and the use of estimating techniques that result in high computation costs. Equipment setup costs are also high since diagnostic measurements must be taken to correlate measured signals to indirect measurements for each piece of equipment.

In some physical systems there are variables which cannot be measured during operation but which affect the ultimate outcome of the system. Thus, some unmonitorable variable (or variables) affect the final system output.

In addition, the measurements that are available from a physical system are not always obtainable at a single time interval (time scale). For example, there may be a first measurement that is obtainable only at a first time scale, a second measurement that is only obtainable at a second time scale, a third measurement that is only obtainable at a third time scale, and so on.

Further, the ultimate variable (or variables) of interest are often only available at a coarse time scale (i.e. a slow rate, for example after each run is completed). In a process for depositing a film on a semiconductor wafer, the thickness of the film deposited cannot be directly measured until the run (or process) is finished.

Moreover, some continuous processes also have variables that must be measured at two or more different time scales. Such variables are sometimes only available at a course time scale and these variables are often the variables that need to be controlled. In a process for controlling the peak power demand in a captive electric generator connected to a power distribution grid, the peak power demand value cannot be directly measured until a set time interval has elapsed.

Often, the task of controlling a system involves not only the control of a single physical system, but the control of a family of similar but not identical physical systems. This situation is most prevalent in high volume manufacturing applications. The characteristics of a single physical system tend to change over time due to equipment degradation and other causes. Moreover, the characteristics of members of a family of physical systems tend to differ from one physical system to another due to equipment manufacturing variations. It is important to account for these differences so that the signal processing or control system may be updated accordingly. Otherwise, the accuracy of the signal processing or control system is compromised.

Current signal processing and control systems do not provide for the rapid calibration of such systems, nor do they provide for the rapid computation of time varying control trajectories to optimize the performance of these systems.

There are a number of related control methods that are collectively known as Model Predictive Control (MPC). MPC computes an optimal trajectory over a finite, but usually long, time interval. The first part (in time) of the optimal trajectory is applied to a system for an interval much shorter than the full time interval and the remaining portion of the optimal trajectory is discarded. In MPC the optimal trajectory applied during the short time period to the system is held constant. At the end of that short time interval, the process is repeated for a second part (in time), i.e., where the first part left off. This process is repeated indefinitely, or as many times as is desired in a continuous process. MPC methods provide continuing control at a single time scale (determined by the short time interval).

Thus, what is needed is an accurate and cost efficient method and apparatus for processing signals generated within a physical system, or family of physical systems, that allow the modification and control of time varying trajectories to optimize the performance of the physical system at different time scales in the face of the issues described above.

SUMMARY OF THE INVENTION

The present invention is a method for modifying and controlling time varying trajectories for signal processing in a physical system, or a family of physical systems. In one embodiment of the present invention the time varying trajectories of a device under control and the related controller are parameterized. For example, the reference (or command) signals and the actuator commands (or control signals) are all parameterized. Next, a vector valued function is computed such that if the reference (or command) signals are acted on by the vector valued function, the outcome parameters result. An estimator that captures the dynamic behavior of the physical system is then built. A cost function that evaluates the output of the physical system is then built. The reference signals are set to a nominal reference trajectory. The physical system is then run using the most recent reference signals. The estimator is then run using valuations for the most recent measured outcome parameters and the most recent control signals to produce an estimated output. The estimated output is then evaluated. If the estimated output is approximately the desired outcome then the system stops. However, if the estimated output is not approximately the desired outcome, then the process continues. The upper and lower bounds for the actuator commands are determined such that the control signals will not reach saturation within these bounds. A constrained nonlinear program is then run to produce new reference signals. The new reference signals are then compared to the previous reference signals. If the new reference signals are approximately the same as the previous reference signals then the system stops. However, if the new reference signals are not approximately the same as the previous reference signals, then the process steps are repeated by running the new reference signals on the physical system to produce a new outcome parameter.

Additional features and benefits of the present invention will become apparent from the detailed description, figures, and claims set forth below.

BRIEF DESCRIPTION OF THE DRAWINGS

The present invention is illustrated by way of example and not limitation in the accompanying figures in which.

DETAILED DESCRIPTION

Figure 1:
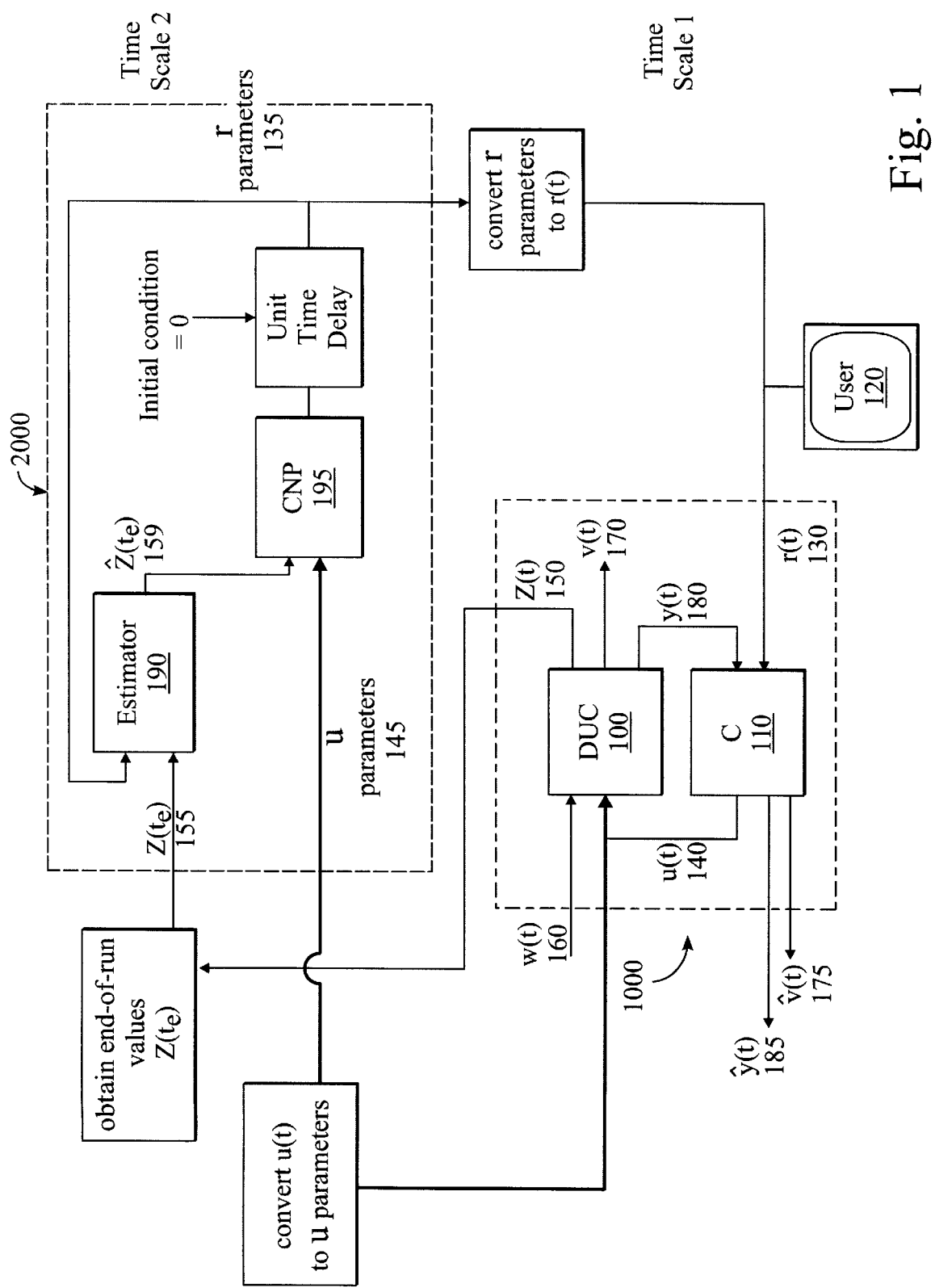
FIG. 1 illustrates an embodiment of the present invention having a device under control and a control system.

A method and apparatus for dynamic optimization is disclosed. In the following description, numerous specific details are set forth such as specific equipment, processes, parameters, etc. in order to provide a thorough understanding of the present invention. It will be obvious, however, to one skilled in the art that these specific details need not be employed to practice the present invention. In other instances, well known materials or methods have not been described in detail in order to avoid unnecessarily obscuring the present invention.

Additionally, it should be noted that although the present invention is described in relation to a semiconductor furnace system, one with ordinary skill in the art will recognize that such a description is merely illustrative and is not intended to limit the invention. The specific processes and system described herein are only meant to help clarify one's understanding of the present invention and to illustrate particular embodiments in which the present invention may be implemented. It will be appreciated that the broader spirit and scope of the present invention, as set forth in the appended claims, may be applied to any type of process which seeks the achievements attained by the present invention.

The present invention is a method for processing signals in a physical system (or device under control) in order to optimize time varying trajectories (variables that are functions of time) such that the ultimate output of the device under control (DUC) attains the results desired by the user. The present invention may be used in any system wherein the DUC performs some sort of batch processing or continuous processing. For example, in batch processing, the DUC is started, some process is performed within the DUC for a set period of time, and then the DUC is stopped once the process is completed. Such an operation is repeated time and time again to perform the same process over and over within the DUC. The present invention may be used to optimize the batch process so that the end product of each run meets the users desired specifications.

For example, a DUC may be a semiconductor furnace (furnace) that deposits thin films on semiconductor wafers (wafers). The operation starts by loading wafers into the furnace, the furnace is heated to a temperature, gases in specified amounts are distributed into the furnace in order to deposit a thin film on the wafers, the deposition process is completed, the furnace is cooled, and the wafers are removed. This process may be repeated over and over again for as many wafers as is desired. Another example is a beer brewery. The operation starts by filling a container with water, hops, barley, and other recipe items. The container is then heated to a specified temperature for a specified period of time and then cooled. The contents of the container are strained and then removed from the container. This process is repeated over and over again within the brewery to make multiple batches of beer.

On the other hand, for continuous processes, the process never really stops but keeps on going, and may or may not produce a specific end product. The present invention may be used to optimize a continuous process, for example, to account for changes that may occur at various times of the day, such as the change in temperature of the user's building from morning to afternoon or evening. Another example may be the change in shift to slow down the process during hours when the number of personnel running the process is decreased. Yet another example of a continuous process is in controlling the peak power demand in a captive electric generator which is connected to a power distribution grid. The peak power demand is computed by integrating over a specific time interval (such as a 15 minute interval) and then controlling the sampled integrated value at the end of the time interval. The present invention may be used to control the peak demand value, to a target value, even though the power generation process is continuous (i.e., the power generation process does not stop like a semiconductor furnace).

Generalized Invention

FIG. 1 illustrates a generic device under control (DUC) 100 that is being controlled by controller 110 and a user 120. User 120 is the manufacturer that is using the DUC 100 to perform some task (i.e., a batch process and/or continuous process). As illustrated in FIG. 1, there are process variables associated with the physical system 1000 (i.e. DUC 100 and Controller 110). In the physical system 1000 of FIG. 1, there are reference (or command) signals, r(t) 130, which are provided to the controller 110 by the user 120, measured signals, y(t) 180, which are measured in the DUC 100 and are provided to the controller 110, actuator commands, u(t) 140, which are provided to the DUC 100 by controller 110, unmeasurable variables of interest, z(t) 150, which cannot be measured until the process is completed, and unmeasured disturbances, w(t) 160, which are phenomenon (or disturbances) that occur during the process which cannot be controlled or measured, but that are going to affect the output of the DUC.

Some other variables that may be used are virtually sensed unmeasurable variables of interest, v(t) 170, which cannot be directly measured during or after the process is completed and estimates of virtually-sensed variables, $\hat{v}(t)$ 175. Such virtually-sensed variables are unavailable in conventional control systems. However, values of such virtually-sensed variables may be obtained by using a Clair-Voyant™ Controller available from Voyan Technology Incorporated of Santa Clara, Calif.

It should be noted that all of the variables defined above are time varying and may be sampled at various particular time scales (or time intervals). It should also be noted that there may be other variables associated with a physical system and that the variables used in this description are merely given as illustrative examples and are not a complete and all encompassing list of all possible variables for all physical systems.

The present invention is used to optimize the final output (i.e., the $z(t_e)$ 150, wherein $t_e$ is the time that the process ends), which cannot be measured during the process, by controlling the r(t) 130 and u(t) 140 using the results of y(t) 180 and taking into account the w(t) 160. By using the results of y(t) 180 and taking into account the w(t) 160, the user 120 and controller 110 are able to control the r(t) 130 and u(t) 140, respectively, such that the physical system 1000 is optimized to produce the desired result $z(t_e)_{desired}$.

Additionally, the present invention may be used to control and/or optimize the physical system 1000 such that the repeatability of the system is optimized. In other words, every time the process recipe or batch process is run on the physical system the output of the system $z(t_e)$ 150 is approximately the same.

In order to perform a process repeatably it is desirable to create an r(t) 130, which is a time varying setpoint trajectory for the DUC 100 and controller 110, between the starting time, $t_s$, and the ending time, $t_e$. For example, r(t) 130 may be temperature setpoints for various heaters within a semiconductor furnace or peak power demand values for a electric power generator. Also, it is desirable to keep u(t) 140 within some specified bounds between $t_s$ and $t_e$ in order to keep the actuators from reaching saturation.

Saturation is the point at which the actuator variables reach their maximums and/or minimums. An important effect of saturation is that once the control variables reach their maximums and/or minimums the control system is no longer able to make small variations in the actuator signals to compensate for variations in the operation of the system. Thus, feedback control may be temporarily lost. For example, u(t) 140 may be actuator variables such as heater powers, gas flow rates, etc. within a semiconductor furnace or the voltage applied to a motor.

Additionally, it is desirable for the physical system 1000 to be robust in the light of unknown disturbances w(t) 160. In other words, these disturbances, w(t) 160, are present each time the physical system operates and they are consistent from run to run, but they are not directly measurable and therefore it is hard to determine exactly what they are. Thus, a robust physical system would have an r(t) that would give good end results, $z(t_e)$, despite the fact that the disturbances were occurring. For example, w(t) 160 may be a depletion effect in a chemical vapor deposition process for semiconductor wafers. Depletion effects may cause more film to be deposited at the edge of the wafers than at the center of the wafers during a chemical vapor deposition process. Another example of a disturbance, w(t) 160, may be the use of air conditioning during the summer months as a factor in determining the peak power demand in an electric power generator for a local municipality.

Figure 2A:
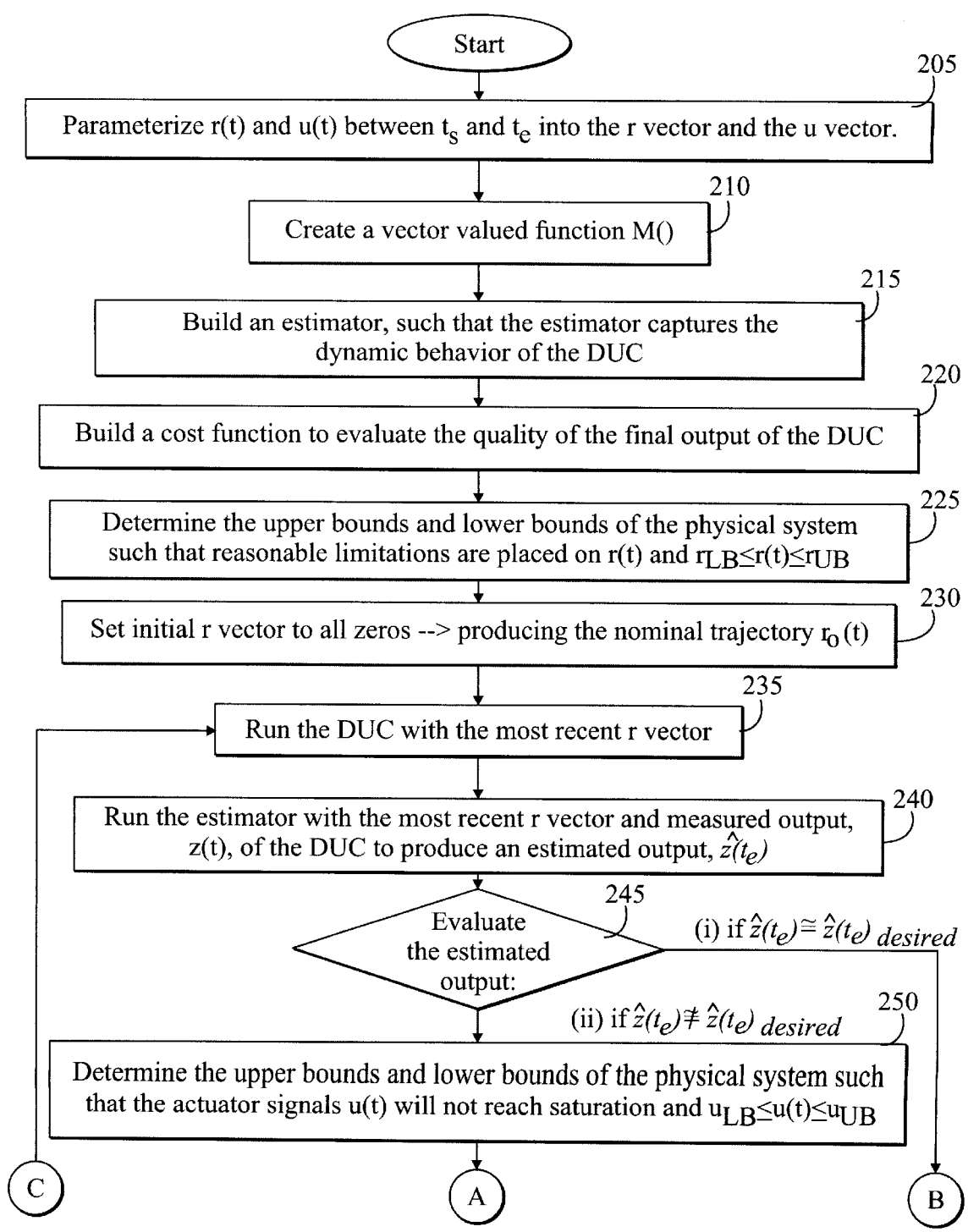
FIGS. 2a and 2b illustrate a flow chart of one embodiment of the present invention.
Figure 2B:
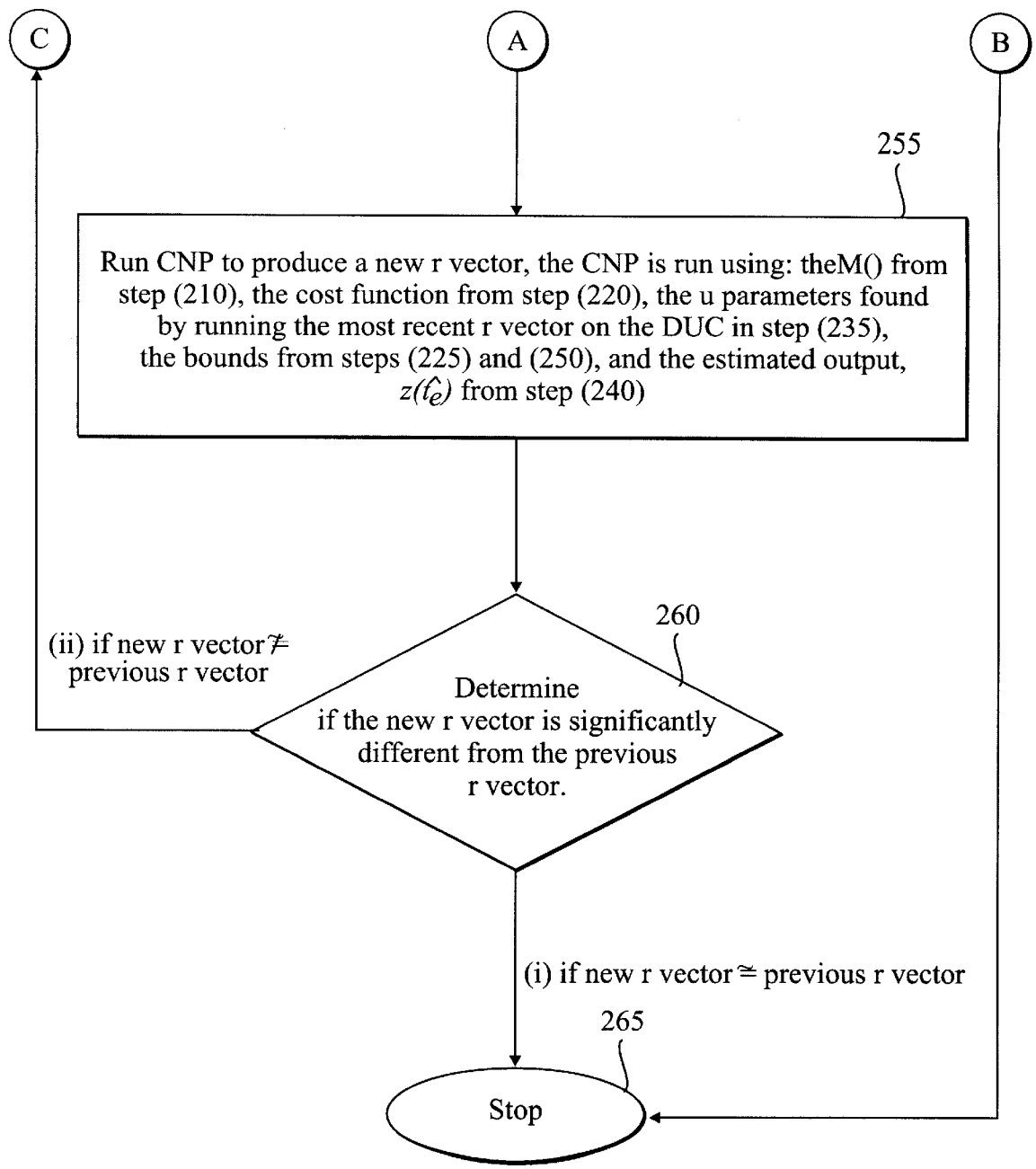

An embodiment of the present invention starts by parameterizing the time varying trajectories for the physical system: r(t), u(t) and z(t) between the time the whole process being run in the DUC starts at $t_s$ ($t_s$=the time the process starts) and the time the process being run in the DUC ends at $t_e$ ($t_e$=the time the process ends), as illustrated in FIGS. 2a and 2b, step 205. The time varying setpoint trajectory r(t) is parameterized as $r_o$, which is a nominal trajectory that may already be time varying, and a function of an r vector with length $n_r$ (i.e. the elements of r vector have indices 1 to $n_r$, such that r vector=

$$r \text{ vector} = \begin{bmatrix} r_1 \\ \vdots \\ r_{n_r} \end{bmatrix},$$

as shown in the following equation:

$$r(t) = r_0(t) + \text{a function of} \begin{bmatrix} r_1 \\ \vdots \\ r_{n_r} \end{bmatrix}. \quad \text{(Eqn. 1)}$$

Thus, a time varying setpoint trajectory (or reference signal), r(t), has been parameterized so it can be represented by a finite, but not too large, number of variables, $n_r$. The time varying actuator commands (or control signals), u(t), and the time varying output, z(t), are parameterized in a similar manner into a u vector (with indices 1 to $n_u$) and z vector (with indices 1 to $n_z$), respectively, such that u vector=

$$u \text{ vector} = \begin{bmatrix} u_1 \\ \vdots \\ u_{n_u} \end{bmatrix}$$

and $$z \text{ vector} = \begin{bmatrix} z_1 \\ \vdots \\ z_{n_z} \end{bmatrix}.$$

The equations for the parameterization of u(t) and z(t) are as follows:

$$u(t) = u_0(t) + \text{a function of} \begin{bmatrix} u_1 \\ \vdots \\ u_{n_u} \end{bmatrix}, \text{ and} \quad \text{(Eqn. 2)}$$

$$z(t_e) = z_0(t_e) + \text{a function of} \begin{bmatrix} z_1 \\ \vdots \\ z_{n_z} \end{bmatrix}, \text{ respectively.} \quad \text{(Eqn. 3)}$$

The time varying trajectories, r(t) and/or u(t), are parameterized so that changes in the reference signals and/or control signals may be made at any time over a run rather than being held constant. Parameterizing the time varying trajectories creates additional degrees of freedom to optimize the output of the physical system at time $t_e$, $z(t_e)$. These degrees of freedom are not available if the reference signals and control signals are held constant. Thus, the present invention is capable of optimizing the physical system to provide outputs that are better than if a constant trajectory were used.

It should be noted that, for ease of understanding, throughout this specification the time varying trajectories are shown as functions of time, for example, the setpoint trajectories are shown as r(t). Similarly, the parameters are shown as vectors, for example, the r (setpoint) parameters are illustrated as vector $$\begin{bmatrix} r_1 \\ \vdots \\ r_{n_r} \end{bmatrix}.$$

It should also be noted that in FIG. 1, physical system 1000 uses time varying trajectories and model 2000 uses parameters. Therefore, it has been necessary to include in FIG. 1 boxes which delineate that the time varying trajectories are being converted into parameters when necessary for use in the model 2000 (for example, u(t)→u parameters) and boxes which delineate that the parameters are being converted into time varying trajectories when necessary for use in the physical system 1000 (for example, r parameters→r(t)).

Additionally, it should be noted that the terminology "reference signals" may be used as a generic term to encompass any of the more specific terminology, such as r vector, r parameter, r(t), reference time varying trajectory, etc. One with ordinary skill in the art will understand that the use of the generic term will delineate the more specific term in view of the context it is being used due to the mathematical relationships between the r vector, r parameter, and r time varying trajectory. For example, if the general term "reference signals" is used in the context of the setpoints that are fed into the physical system, one with ordinary skill in the art would understand that the physical system would need the r time varying trajectory. Therefore, the generic term reference signal would be interpreted in that context as the r time varying trajectory.

Similarly, the generic term "actuator signals" (or "control signals") may be used to encompass any of the more specific terminology, such as u vector, u parameter, u(t), actuator (or control) time varying trajectory, etc.

Next, a vector valued function, M( ), is formulated that relates the time varying variables r(t), u(t), and z(t) to one another such that when r vector is acted on by the vector valued function, M( ), the result is the u vector and z vector, see FIGS. 2a and 2b, step 210. This concept is illustrated by the following equations wherein the vector valued function M( ) has been broken down into $M_1$( ) and $M_2$( ):

$$m() = \begin{bmatrix} m_1() \\ m_2() \end{bmatrix}, \text{ such that } \begin{bmatrix} \begin{bmatrix} z_1 \\ \vdots \\ z_{n_z} \end{bmatrix} \\ \begin{bmatrix} u_1 \\ \vdots \\ u_{n_u} \end{bmatrix} \end{bmatrix} \cong \begin{bmatrix} m_1 \left( \begin{bmatrix} r_1 \\ \vdots \\ r_{n_r} \end{bmatrix} \right) \\ m_2 \left( \begin{bmatrix} r_1 \\ \vdots \\ r_{n_r} \end{bmatrix} \right) \end{bmatrix}. \quad \text{(Eqns. 4,5)}$$

What results is a static vector equation that relates the r parameters to the z parameters and the u parameters of a very complicated dynamic physical system. This is a static model that specifically models dynamic time varying behavior of a physical system. Thus, this static model captures the dynamics of the system is such a way that allows the present invention to perform (or optimize processing with physical system 1000) better than if a purely static model were used.

In order to account for the unmeasured disturbances, w(t), that affect the physical system, an estimator is built, see FIGS. 2a and 2b, step 215. The estimator is built to capture the dynamic behavior of the device under test. The estimator is designed to estimate the output, $z(t_e)$, if a particular set of setpoint (or reference) parameters, i.e. the r vector, are used. The measured output, $z(t_e)$ 150, from the device under control and the r parameters are fed into the estimator and the estimator produces an estimated output, $\hat{z}(t_e)$ 159. Since the w(t) affects the output, $z(t_e)$ 150, in a consistent fashion, the w(t) is taken into account in the estimator when $z(t_e)$ 150 is fed into the estimator. For a detailed explanation and examples of how an estimator may be built, see for example, copending application Ser. No. 08/917,053 filed on Aug. 22, 1997, titled "A Method for Real-Time Nonlinear System State Estimation and Control," now pending, which is assigned to the assignee herein.

In one embodiment of the present invention the estimator is built by using a Kalman Filter (KF) or an Extended Kalman Filter (EKF), wherein the state equation is $$z_o(t_e)|_{k+1} = z_o(t_e)|_k \quad \text{(Eqn. 6)}$$

and the output equation is $$z(t_e)|_k = z_0(t_e)|_k + m_1 \left( \begin{bmatrix} r_1 \\ \vdots \\ r_{n_r} \end{bmatrix} \bigg|_k \right). \quad \text{(Eqn. 7)}$$

The model of the output, $z(t_e)$, for a run of the physical system is illustrated in the following equation:

$$z(t_e) = z_0(t_e) + \begin{bmatrix} z_1 \\ \vdots \\ z_{n_z} \end{bmatrix} = z_0(t_e) + m_1 \left( \begin{bmatrix} r_1 \\ \vdots \\ r_{n_r} \end{bmatrix} \right). \quad \text{(Eqn. 8)}$$

A cost function is built to evaluate quality of the final output of the DUC, see FIGS. 2a and 2b, step 220. A scalar valued cost function, $f$, may be built and minimized as shown in the following equation:

$$\min_r (f(z(t_e)|)_{desired} - \hat{z}(t_e)), \quad \text{(Eqn. 9)}$$

wherein $$\hat{z}(t_e) = \hat{z}_0(t_e) + \begin{bmatrix} z_1 \\ \vdots \\ z_{n_z} \end{bmatrix} = \hat{z}_0(t_e) + m_1 \left( \begin{bmatrix} r_1 \\ \vdots \\ r_{n_r} \end{bmatrix} \right). \quad \text{(Eqn. 10)}$$

At this point it may be desirous determine the upper and lower bounds of the physical system in order to place reasonable limitations on the reference signals, r(t), such that $r_{LB} \leq r(t) \leq r_{UB}$, see FIGS. 2a and 2b, step 225. It should be noted that not all systems will require that constraints be placed upon the reference signals, r(t), and therefore step 225 of FIGS. 2a and 2b may not have to be used to practice the present invention.

An initial run of the physical system should be performed to evaluate a nominal reference trajectory. To do this the r vector is set to zero to produce the nominal trajectory, $r_o(t)$, see FIGS. 2a and 2b, step 230. The device under control is then run using nominal trajectory, $r_o(t)$, to produce an initial measured output, z(t), see FIGS. 2a and 2b, step 235. It should be noted that for the initial run of the system the "most recent r vector" of FIGS. 2a and 2b, step 235 would be the nominal trajectory.

The estimator that was built in step 215 is then run using the valuations for the most recent r vector and the most recent measured output, −z(t), from the physical system. The run of the estimator produces an estimated output, $\hat{z}(t_e)$, see FIGS. 2a and 2b, step 240. It should be noted that for the initial run of the system the "most recent r vector" would be the nominal trajectory and the "most recent measured output" would be the output of the device under test when the nominal trajectory is run on the system. It should be noted that the estimator is running at a different time scale from that of physical system 1000. For convenience the time scale of the estimator will be referred to herein as the second time scale.

The estimated output, $\hat{z}(t_e)$, is then evaluated, see FIGS. 2a and 2b, step 245. If the estimated output, $\hat{z}(t_e)$, is approximately the desired outcome, $z(t_e)_{desired}$, then the system stops because the desired outcome has been achieved. However, if the estimated output, $\hat{z}(t_e)$, is not approximately the desired outcome, $z(t_e)_{desired}$, then the process continues on to step 250.

Recall that the control objective is to find r(t) so that the final output of the DUC is the desired output, i.e., $z(t_e)=z(t_e)_{desired}$, while meeting the constraints on u(t) so that the actuators do not saturate. This requires the determination of the upper and lower bounds on u(t) such that $u_{LB} \leq u(t) \leq u_{UB}$, see FIGS. 2a and 2b, step 250.

A constrained nonlinear program (CNP) is then run to produce a new set of reference signals, see FIGS. 2a and 2b, step 255. The constrained nonlinear program is run using the vector valued function created in step 210, the cost function that was built in step 220, the control signals u(t) that were found when running the most recent reference signals on the physical system in step 235, the bounds on the physical system as determined in steps 225 and 250, and the estimated output,$\hat{z}(t_e)$, from step 240. Thus, the equations for the constrained nonlinear program are as follows:

$$\min_r f(z(t_e)|_{desired} - \hat{z}(t_e)). \qquad (Eqn.\ 9)$$

wherein $f$ is a scalar valued cost function that is to be minimized and wherein $$\hat{z}(t_e) = \left[ \hat{z}_o(t_e) + m_1 \left( \begin{bmatrix} r_1 \\ \vdots \\ r_{n_r} \end{bmatrix} \right) \right] \qquad (Eqn.\ 10)$$

subject to $$u_{LB} \leq m_2 \left( \begin{bmatrix} r_1 \\ \vdots \\ r_{n_r} \end{bmatrix} \right) \leq u_{UB} \qquad (Eqn.\ 11)$$

and possibly subject to $$r_{LB} \leq \begin{bmatrix} r_1 \\ \vdots \\ r_{n_r} \end{bmatrix} \leq r_{UB'} \qquad (Eqn.\ 12)$$

if it is desired to place reasonable limitations on the reference signals, and wherein $$\begin{bmatrix} u_1 \\ \vdots \\ u_{n_u} \end{bmatrix} = m_2 \left( \begin{bmatrix} r_1 \\ \vdots \\ r_{n_r} \end{bmatrix} \right). \qquad (Eqn.\ 13)$$

It should be noted that the constrained nonlinear program is running at a different time scale from that of physical system 1000. The constrained nonlinear program may be running at the same time scale or a different time scale from the estimator. In this example, the constrained nonlinear program will be discussed as running at the same time scale as the estimator. As discussed previously, for convenience, the time scale of the estimator and consequently the constrained nonlinear program will be referred to herein as the second time scale. In light of the different time scales, it should be noted that the constrained nonlinear program is running at a second time scale but is producing a reference signal that is to be used in the physical system at the first time scale.

Although the constrained program is described above as being a constrained nonlinear program, the constrained program may be selected from any of the following: linear programming, nonlinear programming, constrained nonlinear programming, constrained quadratic programming, and a combination thereof.

After the CNP is run, the new reference signals are evaluated, see FIGS. 2a and 2b, step 260. The new reference signals are evaluated by comparing the new reference signals to the previous reference signals. If the new reference signals are approximately the same as the previous reference signals then the system stops because the system has achieved the best results possible. However, if the new reference signals are not approximately the same as the previous reference signals, then the process steps are repeated starting by running the new reference signals on the physical system at step 235 to produce a new outcome.

It should be noted that, it is highly likely that more than one run may be necessary to reach the desired output. For example, more than one run may be necessary if the model is not exact, or if the measurements are noisy, or if the original r parameters were not close to the r parameters needed to reach the desired output. Thus, two or more runs of the present invention may be needed.

It should also be noted that other comparisons (and/or determinations) may be made while running the present invention. For example, the most recent measured outputs of the device under test may be compared to previous outputs such that if they are the same (or close) the system may be stopped because changing the reference signals is not affecting the output of the physical system. In other words, if after a run of the DUC, the new measured output is approximately the previous measured output then the system may be stopped. Another example, would be to compare the estimated outputs. After running the CNP to produce new reference signals, the new reference signals can be run through the estimator to determine what the new estimated output will be for those parameters. If the new estimated output is approximately the same as the previous estimated output, then the system may be stopped because the output will probably not get any closer to the desired output by adjusting the reference signals.

Figure 3A:
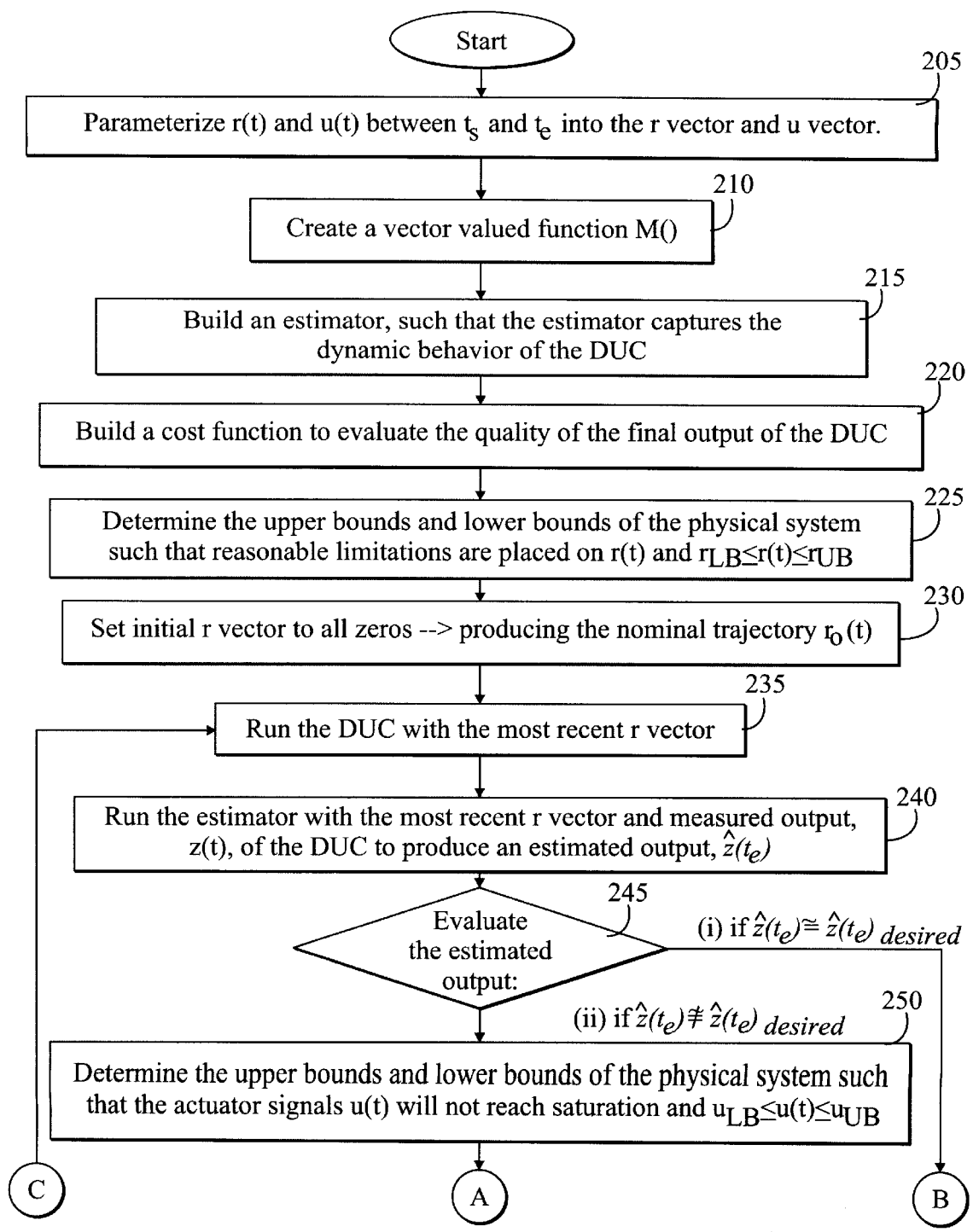
FIGS. 3a and 3b illustrate a flow chart of another embodiment of the present invention.
Figure 3B:
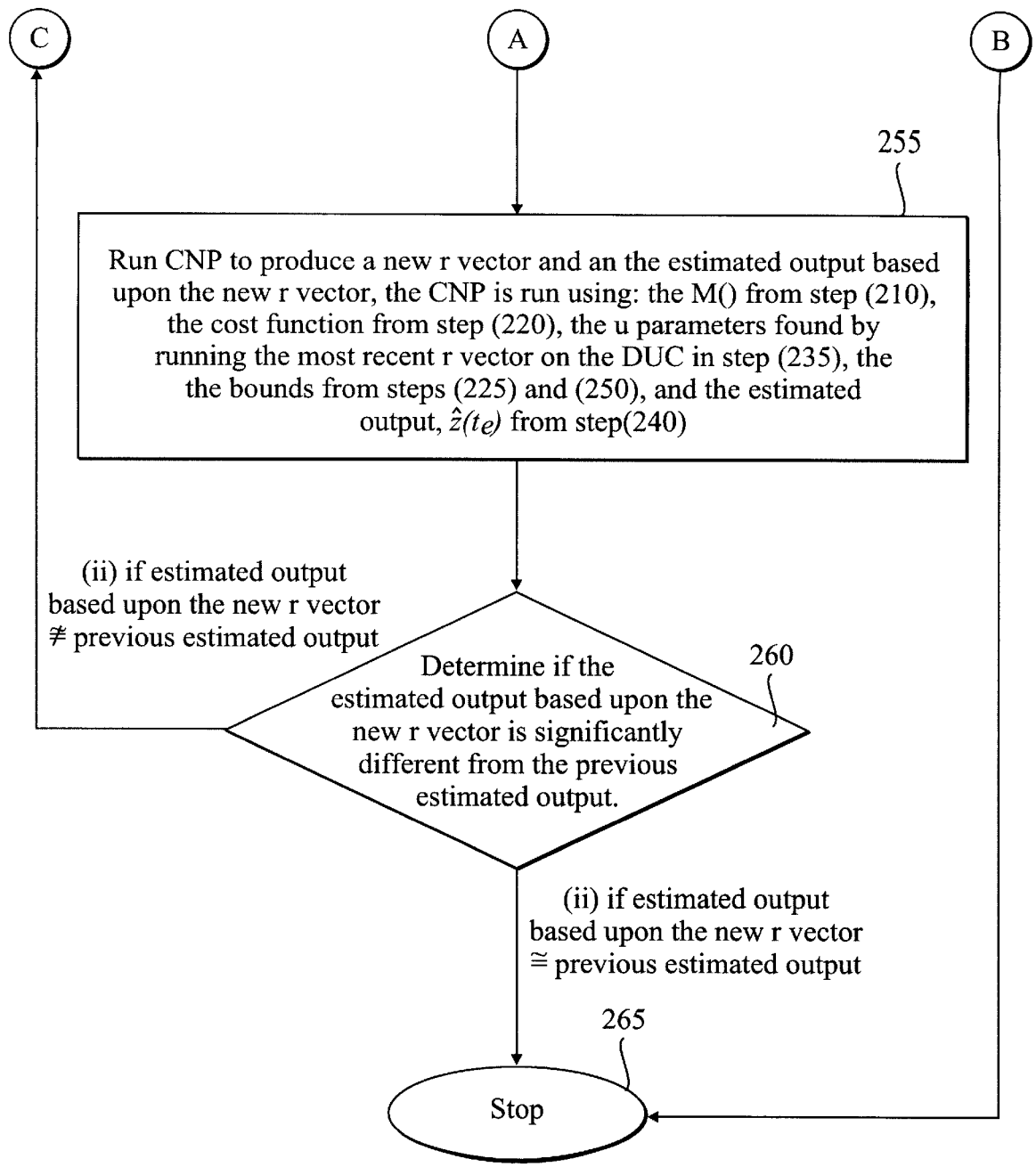

FIGS. 3a and 3b illustrate another embodiment of the present invention using a different determination. In the embodiment illustrated in FIGS. 3a and 3b, all of the steps are similar to that of the embodiment illustrated in FIGS. 2a and 2b with the exception of steps 255 and 260. In the embodiment illustrated in FIGS. 3a and 3b, at step 255, the constrained nonlinear program produces a new reference signal and an estimated output based upon that new reference signal. Then in step 260, of FIGS. 3a and 3b, the estimated output based upon the new reference signal is evaluated by comparing the estimated output based upon the new reference signal to the previous estimated output, for example the estimated output from step 240. If the estimated output based upon the new reference signal is approximately the same as the previous estimated output then the system stops because the system has achieved the best results possible. However, if the estimated output based upon the new reference signal is not approximately the same as the previous estimated output, then the process steps are repeated starting by running the new reference signals on the physical system at step 235 to produce a new outcome.

Additionally, it should be noted that Model 2000 which includes estimator 190 and CNP 195 may be run at a different time scale from that of physical system 1000. Thus, Model 2000 may be run several times during a single run of physical system 1000, or vice versa. The use of multiple time scales allows the entire time varying trajectory for physical system 1000 to be determined in a single run of Model 2000 in order to optimize the desired output of the physical system.

Moreover, it should be noted that the above description describes the present invention with respect to a batch process. However, the present invention may be used in a continuous process as well. When sampling and running the estimator and constrained nonlinear program in a continuous process, the sampling periods expand from one run $t_s \rightarrow t_e$ (as in the batch process) for as many runs as desired, into $t_{s1} \rightarrow t_{e1}$, (in one sampling period) to $t_{s2} \rightarrow t_{e2}$ (for a second sampling period) and so on for as many sampling periods as desired. Each sampling period for the continuous process could be considered a "run" as described for batch processes. In the electric power generator example, the sampling period may be every 15 minutes.

Constrained Quadratic Embodiment

An embodiment of the present invention uses a constrained quadratic program for the constrained nonlinear program 195. The constrained quadratic program embodiment follows similar process steps to those outlined in the discussion of the generalized invention above. Therefore, only the areas in which the constrained quadratic program embodiment deviates from the generalized invention are discussed below.

The constrained quadratic program embodiment also starts by parameterizing the set of time varying trajectories for the physical system 1000, r(t), u(t) and z(t), between the time the whole process being run in the DUC starts at $t_s$ and ends at $t_e$. In the constrained quadratic program embodiment the time varying trajectories are parameterized using nominal trajectories as above. However, the functions of the vectors are linear. The parameterizations of the time varying trajectories are shown in the following equations:

$$r(t) = r_o(t) + \text{linear function of} \begin{bmatrix} r_1 \\ \vdots \\ r_{n_r} \end{bmatrix}, \quad \text{(Eqn. 14)}$$

$$u(t) = u_o(t) + \text{linear function of} \begin{bmatrix} u_1 \\ \vdots \\ u_{n_u} \end{bmatrix}, \text{ and} \quad \text{(Eqn. 15)}$$

$$z(t_e) = z_o(t_e) + \text{linear function of} \begin{bmatrix} z_1 \\ \vdots \\ z_{n_z} \end{bmatrix}, \text{ respectively.} \quad \text{(Eqn. 16)}$$

Next, in the constrained quadratic program embodiment, a matrix, M, (rather than a vector valued function, M( )) is formulated that relates the time varying variables r(t), u(t), and z(t) to one another such that when r vector is multiplied by the matrix, M, the result is the u vector and z vector. This concept is illustrated by the following equations wherein M has been broken down into matrices $M_1$ and $M_2$:

$$M = \begin{bmatrix} M_1 \\ M_2 \end{bmatrix}, \text{ such that } \begin{bmatrix} \begin{bmatrix} z_1 \\ \vdots \\ z_{n_z} \end{bmatrix} \\ \begin{bmatrix} u_1 \\ \vdots \\ u_{n_u} \end{bmatrix} \end{bmatrix} \cong \begin{bmatrix} M_1 \\ M_2 \end{bmatrix} \begin{bmatrix} r_1 \\ \vdots \\ r_{n_r} \end{bmatrix}. \quad \text{(Eqns. 17, 18)}$$

What results is a static matrix equation that relates the r parameters to the z parameters and the u parameters of a very complicated dynamic physical system. This is a static model that specifically models dynamic time varying behavior of a physical system. Thus, this static model captures the dynamics of the system is such a way that allows the present invention to perform (or optimize the physical system) better than if a purely static model were used.

In order to account for the unmeasured disturbances, w(t), that affect the physical system, once again an estimator is built. The estimator is designed to estimate the output, $z(t_e)$, if a particular set of setpoint parameters, i.e. the r vector, is used. See the discussion of estimators given above. As in the general overview of the invention, the constrained quadratic embodiment of the present invention may also use an estimator that is built by using a Kalman Filter (KF) or an Extended Kalman Filter (EKF), wherein the state equation is $$z_o(t_e)|_{k+1} = z_o(t_e)|_k \quad \text{(Eqn. 6)}$$

and the output equation is $$z(t_e)|_k = z_o(t_e)|_k + M_1 \begin{bmatrix} r_1 \\ \vdots \\ r_{n_r} \end{bmatrix}\bigg|_k. \quad \text{(Eqn. 19)}$$

The model of the output, $z(t_e)$, for a run of the physical system is illustrated in the following equation:

$$z(t_e) = z_o(t_e) + \begin{bmatrix} z_1 \\ \vdots \\ z_{n_z} \end{bmatrix} = z_o(t_e) + M_1 \begin{bmatrix} r_1 \\ \vdots \\ r_{n_r} \end{bmatrix}. \quad \text{(Eqn. 20)}$$

In the constrained quadratic program embodiment the cost function is also built to evaluate the quality of the final output of the DUC. The cost function for the constrained quadratic program embodiment may be built and minimized as follows:

$$\min_r \| z(t_e)|_{desired} - \hat{z}(t_e) \|_2^2 \quad \text{(Eqn. 21)}$$

$$\text{wherein } \hat{z}(t_e) = \begin{bmatrix} \hat{z}_o(t_e) + M_1 \begin{bmatrix} r_1 \\ \vdots \\ r_{n_r} \end{bmatrix} \end{bmatrix} \quad \text{(Eqn. 22)}$$

$$\text{subject to } u_{LB} \leq M_2 \begin{bmatrix} r_1 \\ \vdots \\ r_{n_r} \end{bmatrix} \leq u_{UB} \quad \text{(Eqn. 23)}$$

$$\text{and possibly subject to } r_{LB} \leq \begin{bmatrix} r_1 \\ \vdots \\ r_{n_r} \end{bmatrix} \leq r_{UB}, \quad \text{(Eqn. 12)}$$

if it is desired to place reasonable limitations on the reference signals, $$\text{and wherein } u(t) = M_2 \begin{bmatrix} r_1 \\ \vdots \\ r_{n_r} \end{bmatrix}. \quad \text{(Eqn. 24)}$$

Smoothing Technique

Another embodiment of the present invention includes a "smoothing" technique. It should be noted that the smoothing technique is discussed below as being applied to the equations of the generalized invention discussion given above. The smoothing technique is used to control the setpoint time varying trajectories, r(t), and the actuator time varying trajectories, u(t), such that they do not fluctuate in an extreme fashion but rather fluctuate in a smooth fashion. Controlling the fluctuation of r(t) and/or u(t) improves the control over the physical system.

As an example, consider the case where it is desirable to have all of the adjacent values of the r vector to be near each other. That is, the difference between the r values, $(r_1-r_2)$, $(r_2-r_3)$, etc., should be fairly small. This can be accomplished by creating the matrix $N_1$ such that $$N_1 = C * \begin{bmatrix} 1 & -1 & 0 & 0 & 0 & 0 & \cdots \\ 0 & 1 & -1 & 0 & 0 & 0 & \cdots \\ 0 & 0 & 1 & -1 & 0 & 0 & \cdots \\ & & & \cdots & & & \end{bmatrix} \quad \text{(Eqn. 25)}$$

where C is some constant. To achieve a desired outcome $Z(t_e)_{desired}$ and also keep r(t) fairly smooth, a cost function such as $N_1r$ is then added to the vector valued cost function of Equation 7 as follows:

$$\min_r f_1(z(t_e)|_{desired} - \hat{z}(t_e)) + f_2(N_1r), \quad \text{(Eqn. 26)}$$

wherein $f_1$ and $f_2$ are scalar valued cost functions. It should be noted that in the matrix cost function example given above the cost function becomes:

$$\min_r \|(z(t_e)|_{desired} - \hat{z}(t_e)\|_2^2 + \|N_1r\|_2^2 \quad \text{(Eqn. 27)}$$

Thus, a "smooth" r vector has been created. Depending on the way in which the r vector parameterizes into r(t), it may also yield a "smooth" r(t). It should be noted that the constant C can be adjusted to balance the relative importance of the "smoothing" with the goal of achieving the desired outcome $z(t_e)$desired.

The same smoothing technique can be applied to the u vector as well. A similar matrix $N_2$ can be formed, and the vector valued cost function becomes $$\min_r f_1(z(t_e)|_{desired} - \hat{z}(t_e)) + f_2(N_1r) + f_3(N_2M_2(r)), \quad \text{(Eqn. 28)}$$

wherein $f_1$, $f_2$, and $f_3$ are scalar valued cost functions and recalling that $u=M_2(r)$. In a similar manner the matrix cost function becomes:

$$\min_r \|(z(t_e)|_{desired} - \hat{z}(t_e)\|_2^2 + \|N_1r\|_2^2 + \|N_2M_2r\|_2^2 \quad \text{(Eqn. 29)}$$

recalling that $u=M_2r$. This cost function can be used to try to find an r vector that achieves the desired outcome and also yields smooth r(t) and u(t).

Unknown Parameters

Another embodiment of the present invention takes into account unknown parameters by modifying the vector valued function M( ) and/or matrix M, such that they are functions of an unknown parameter (or vector) alpha, $\alpha$. In other words, a family of relationships between r vectors, u vectors, and z vectors may be obtained. In such a case, the relationship between the r and z vectors becomes $$z = M(r,\alpha). \quad \text{(Eqn. 30)}$$

In some cases, or for a particular application, the vector of values $\alpha$ may be constant but unknown. In this case an estimator may be built that simultaneously estimates $z(t_e)$ and $\alpha$. In this case, the estimator state equation becomes:

$$\begin{bmatrix} \hat{z}_0(t_e) \\ \hat{\alpha} \end{bmatrix}\Big|_{k+1} = \begin{bmatrix} \hat{z}_0(t_e) \\ \hat{\alpha} \end{bmatrix}\Big|_k \quad \text{(Eqn. 31)}$$

and the estimator output equation becomes:

$$\hat{z}(t_e)|_k = \hat{z}_0(t_e)|_k + M_1\left(\begin{bmatrix} r_1 \\ \vdots \\ r_{n_r} \end{bmatrix}\Big|_k, \alpha\Big|_k\right). \quad \text{(Eqn. 32)}$$

An example of this application is a furnace used to perform chemical vapor deposition on a batch of wafers. The final wafer thicknesses may be known to be proportional to a matrix M times the r vector, but the exact proportionality constant may be unknown or may be different for several similar but not identical processes. In such a case, the function $z=M(r,\alpha)$ becomes $z=\alpha Mr$, where $\alpha$ is a single, unknown but unchanging proportionality constant.

Thus, a method and apparatus for dynamic optimization that operate at multiple time scales have been described. Although specific embodiments, including specific equipment, parameters, methods, and equations have been described, various modifications to the disclosed embodiments will be apparent to one of ordinary skill in the art upon reading this disclosure. Therefore, it is to be understood that such embodiments are merely illustrative of and not restrictive on the broad invention and that this invention is not limited to the specific embodiments shown and described.

What is claimed is:

1. A dynamic optimizer comprising:
    a dynamic physical system, wherein said dynamic physical system runs at a first time scale;
    an estimator, wherein said estimator captures the dynamic and time varying behavior of said physical system and wherein said estimator runs at a second time scale; and
    a constrained program, wherein said constrained program runs at said second time scale and wherein said constrained program uses a cost function to evaluate the quality of a final output of said dynamic physical system and if necessary produces a time varying trajectory, said time varying trajectory to be used by said dynamic physical system in said first time scale.

2. The dynamic optimizer as described in claim 1 wherein said dynamic physical system includes a device under control and a controller.

3. The dynamic optimizer as described in claim 1 wherein said physical system operates using at least one of the following time varying trajectories: reference time varying trajectory, measured time varying trajectory, actuator time varying trajectory, disturbance time varying trajectory, and output time varying trajectory.

4. The dynamic optimizer as described in claim 1 wherein said estimator operates using at least one of the following: reference parameters and output values from said physical system.

5. The dynamic optimizer as described in claim 1 wherein said estimator is selected from the group consisting of: a Kalman Filter and an Extended Kalman Filter.

6. The dynamic optimizer as described in claim 1 wherein the constrained program operates using at least one of the following: an actuator parameter and an estimated output value from said estimator.

7. The dynamic optimizer as described in claim 1 wherein said constrained program is selected from the group consisting of: a linear program, a nonlinear program, a constrained nonlinear program, a constrained quadratic program, and a combination thereof.

8. The dynamic optimizer as described in claim 1 wherein said cost function is a scalar valued cost function:

$$\min_r f(z(t_e)|_{desired} - \hat{z}(t_e)),$$

wherein r is a time varying setpoint trajectory, $z(t_e)$ is a desired output, $$\hat{z}(t_e) = \hat{z}_0(t_e) + \begin{bmatrix} z_1 \\ \vdots \\ z_{n_z} \end{bmatrix} = \hat{z}_0(t_e) + M_1\left(\begin{bmatrix} r_1 \\ \vdots \\ r_{n_r} \end{bmatrix}\right),$$

and $M_1()$ is a vector valuee function.

9. A dynamic optimizer comprising:
a dynamic physical system, wherein said dynamic physical system runs at a first time scale, said dynamic physical system having a device under control and a controller;
an estimator wherein said estimator captures the dynamic and time varying behavior of said physical system and wherein said estimator runs at a second time scale; and
a constrained quadratic program, wherein said constrained program runs at said second time scale and wherein said constrained quadratic program uses a cost function to evaluate the quality of a final output of said dynamic physical system and if necessary produces a reference parameter, said reference parameter to be used by said dynamic physical system in said first time scale.

10. The dynamic optimizer as described in claim 9 wherein said controller operates using at least one of the following time varying trajectories: a reference time varying trajectory and a measured time varying trajectory.

11. The dynamic optimizer as described in claim 9 wherein said controller produces an actuator time varying trajectory.

12. The dynamic optimizer as described in claim 11 wherein said device under control operates using said actuator time varying trajectory.

13. The dynamic optimizer as described in claim 9 wherein said device under control produces at least one of the following time varying trajectories: a measured time varying trajectory and an output time varying trajectory.

14. The dynamic optimizer as described in claim 9 wherein said estimator operates using at least one of the following: reference parameters and output values from said physical system.

15. The dynamic optimizer as described in claim 9 wherein said estimator is selected from the group consisting of: a Kalman Filter and an Extended Kalman Filter.

16. The dynamic optimizer as described in claim 9 wherein the constrained program operates using at least one of the following: an actuator parameter and an estimated output value from said estimator.

17. The dynamic optimizer as described in claim 9 wherein said cost function is a scalar valued cost function:

$$\min_r f(z(t_e)|_{desired} - \hat{z}(t_e)),$$

wherein r is a time varying setpoint trajectory, $z(t_e)$ is a desired output, $$\hat{z}(t_e) = \hat{z}_0(t_e) + \begin{bmatrix} z_1 \\ \vdots \\ z_{n_z} \end{bmatrix} = \hat{z}_0(t_e) + M_1\left(\begin{bmatrix} r_1 \\ \vdots \\ r_{n_r} \end{bmatrix}\right),$$

and $M_1()$ is a vector valued function.

18. A method for dynamic optimization comprising:
creating a model of a dynamic physical system, wherein said physical system runs at a first time scale and said model of said dynamic physical system runs at a second time scale;
creating an estimator for said model running at said second time scale, wherein said estimator captures the dynamic and time varying behavior of said physical system; and
creating a constrained program running at said second time scale, said constrained program using a cost function to evaluate the quality of a final output of said dynamic physical system and if necessary producing a time varying trajectory to control said dynamic physical system running at said first time scale.

19. The method as described in claim 18 wherein creating said model includes the formation of a vector valued function.

20. The method as described in claim 19 wherein said vector valued function is a matrix.

21. The method as described in claim 20 wherein said matrix is modified such that said matrix is a function of an unknown parameter vector.

22. The method as described in claim 19 wherein said vector valued function is modified such that said vector valued function is a function of an unknown parameter.

23. The method as described in claim 18 wherein said estimator is selected from the group consisting of: a Kalman Filter and an Extended Kalman Filter.

24. The method as described in claim 18 wherein creating said constrained program includes the formation of a cost function to evaluate the quality of the output of said physcial system.

25. The method as described in claim 18 wherein said constrained program is selected from the group consisting of: a linear program, a nonlinear program, a constrained nonlinear program, a constrained quadratic program, and a combination thereof.

26. The method as described in claim 18 further including:
determining an upper bound and a lower bound of said physical system such that a reasonable limitation may be placed on a reference signal of said physical system.

27. The method as described in claim 18 further including:
determining an upper bound and a lower bound of said physical system such that an actuator signal of said physical system does not reach saturation.

28. The method as described in claim 18 wherein said cost function is a scalar valued cost function:

$$\min_r f(z(t_e)|_{desired} - \hat{z}(t_e)),$$

wherein r is a time varying setpoint trajectory, $z(t_e)$ is a desired output, $$\hat{z}(t_e) = \hat{z}_0(t_e) + \begin{bmatrix} z_1 \\ \vdots \\ z_{n_z} \end{bmatrix} = \hat{z}_0(t_e) + M_1\left(\begin{bmatrix} r_1 \\ \vdots \\ r_{n_r} \end{bmatrix}\right),$$

and $M_1()$ is a vector valued function.

29. The method as described in claim 18 wherein said method further includes the use of a smoothing technique.

30. A computer readable medium containing executable instructions which, when executed in a processing system, cause said system to perform a method comprising:
creating a model of a dynamic physical system, wherein said physical system runs at a first time scale and said model of said dynamic physical system runs at a second time scale;
creating an estimator for said model running at said second time scale, wherein said estimator captures the dynamic and time varying behavior of said physical system; and
creating a constrained program running at said second time scale, said constrained program using a cost function to evaluate the quality of a final output of said dynamic physical system and if necessary producing a time varying trajectory to control said dynamic physical system running at said first time scale.

31. The computer readable medium as described in claim 30 wherein creating said model includes the formation of a vector valued function.

32. The computer readable medium as described in claim 31 wherein said vector valued function is a matrix.

33. The computer readable medium as described in claim 32 wherein said matrix is modified such that said matrix is a function of an unknown parameter vector.

34. The computer readable medium as described in claim 31 wherein said vector valued function is modified such that said vector valued function is a function of an unknown parameter.

35. The computer readable medium as described in claim 30 wherein said estimator is selected from the group consisting of: a Kalman Filter and an Extended Kalman Filter.

36. The computer readable medium as described in claim 30 wherein creating said constrained program includes forming said cost function to evaluate the quality of the final output of said physical system.

37. The computer readable medium as described in claim 30 wherein said constrained program is selected from the group consisting of: a linear program, a nonlinear program, a constrained nonlinear program, a constrained quadratic program, and a combination thereof.

38. The computer readable medium as described in claim 30 further includes:
determining an upper bound and a lower bound of said physical system such that a reasonable limitation may be placed on a reference signal of said physical system.

39. The computer readable medium as described in claim 30 further includes:
determining an upper bound and a lower bound of said physical system such that an actuator signal of said physical system does not reach saturation.

40. The computer readable medium as described in claim 30 wherein said cost function is a scalar valued cost function:

$$\min_r f(z(t_e)|_{desired} - \hat{z}(t_e)),$$

wherein r is a time varying setpoint trajectory, $z(t_e)$ is a desired output, $$\hat{z}(t_e) = \hat{z}_0(t_e) + \begin{bmatrix} z_1 \\ \vdots \\ z_{n_z} \end{bmatrix} = \hat{z}_0(t_e) + M_1\left(\begin{bmatrix} r_1 \\ \vdots \\ r_{n_r} \end{bmatrix}\right),$$

and $M_1()$ is a vector valued function.

41. The computer readable medium described in claim 30 wherein said method further includes the use of a smoothing technique.

42. A computer readable medium containing executable instructions which, when executed in a processing system, cause said system to perform a method comprising:
a) parameterizing a first set of time varying trajectories, said first set of time varying trajectories including at least: a reference signal and an actuator signal;
b) creating a vector valued function that captures the dynamic and time varying behavior of said physical system;
c) creating an estimator;
d) creating a cost function to evaluate the quality of an output of said physical system;
e) setting said reference signal to a nominal reference trajectory;
f) running said physical system with a most recent reference signal to produce a most recent output value;
g) running said estimator with said most recent reference signal and said most recent output value from said physical system to produce an estimated output;
h) evaluating said estimated output, wherein said estimated output is compared to a desired output such that:
(1) if said estimated output is approximately equal to said desired output, then go to step 1);
(2) if said estimated output is not approximately equal to the desired output, then go to step i);
i) determining an upper bound and a lower bounds for said actuator signal such that said actuator signal does not saturate;
j) running a constrained program to produce a new reference signal;
k) evaluating said new reference signal wherein said new reference signal is compared to a previous reference signal such that:
(1) if said new reference signal is approximately equal to said previous reference signal, then go to step 1);
(2) if said new reference signal is not approximately equal to the previous reference signal, then go to step f); and
l) stop.

43. The computer readable medium as described in claim 42 wherein said step of creating said vector valued function is performed such that when said reference signal is acted on by said vector valued function the result is said outcome variable.

44. The computer readable medium as described in claim 43 wherein said vector valued function is a matrix.

45. The computer readable medium as described in claim 42 wherein said vector valued function is a matrix.

46. The computer readable medium as described in claim 42 wherein said vector valued function is modified such that said vector valued function is a function of an unknown parameter.

47. The computer readable medium as described in claim 42 further includes:
determining an upper bound and a lower bound of said physical system such that a reasonable limitation may be placed on said reference signal of said physical system.

48. The computer readable medium as described in claim 42 wherein said estimator is selected from the group consisting of: a Kalman Filter and an Extended Kalman Filter.

49. The computer readable medium as described in claim 42 wherein said constrained program is selected from the group consisting of: a linear program, a nonlinear program, a constrained nonlinear program, a constrained quadratic program, and a combination thereof.

50. The computer readable medium as described in claim 42 wherein said constrained program is run using: said vector valued function from step (b), said cost function from step (d), an actuator signal found by running said most recent reference signal on said physical system in step (f), said upper bound and said lower bound on said actuator signal from step (i), and said estimated output from step (g).

51. The computer readable medium as described in claim 42 wherein said method further includes the use of a smoothing technique.

52. A computer readable medium containing executable instructions which, when executed in a processing system, cause said system to perform a method comprising:
a) parameterizing a first set of time varying trajectories, said first set of time varying trajectories including at least: a reference signal and an actuator signal;
b) creating a vector valued function that captures the dynamic and time varying behavior of said physical system;
c) creating an estimator;
d) creating a cost function to evaluate the quality of an output of said physical system;
e) setting said reference signal to a nominal reference trajectory;
f) running said physical system with a most recent reference signal to produce a most recent output value;
g) running said estimator with said most recent reference signal and said most recent output value from said physical system to produce an estimated output;
h) evaluating said estimated output, wherein said estimated output is compared to a desired output such that:
(1) if said estimated output is approximately equal to said desired output, then go to step l);
(2) if said estimated output is not approximately equal to the desired output, then go to step i);
i) determining an upper bound and a lower bounds for said actuator signal such that said actuator signal does not saturate;
j) running a constrained program to produce a new reference signal and an estimated output based upon said new reference signal;
k) evaluating said estimated output based upon said new reference signal wherein said estimated output based upon said new reference signal is compared to a previous estimated output such that:
(1) if said estimated output based upon said new reference signal is approximately equal to said previous estimated output, then go to step l);
(2) if said estimated output based upon said new reference signal is not approximately equal to the previous estimated output, then go to step f); and
l) stop.

53. The computer readable medium as described in claim 52 wherein said step of creating said vector valued function is performed such that when said reference signal is acted on by said vector valued function the result is said outcome variable.

54. The computer readable medium as described in claim 53 wherein said vector valued function is a matrix.

55. The computer readable medium as described in claim 52 wherein said vector valued function is a matrix.

56. The computer readable medium as described in claim 52 wherein said vector valued function is modified such that said vector valued function is a function of an unknown parameter.

57. The computer readable medium as described in claim 52 further includes:
determining an upper bound and a lower bound of said physical system such that a reasonable limitation may be placed on said reference signal of said physical system.

58. The computer readable medium as described in claim 52 wherein said estimator is selected from the group consisting of: a Kalman Filter and an Extended Kalman Filter.

59. The computer readable medium as described in claim 52 wherein said constrained program is selected from the group consisting of: a linear program, a nonlinear program, a constrained nonlinear program, a constrained quadratic program, and a combination thereof.

60. The computer readable medium as described in claim 52 wherein said constrained program is run using: said vector valued function from step (b), said cost function from step (d), an actuator signal found by running said most recent reference signal on said physical system in step (f), said upper bound and said lower bound on said actuator signal from step (i), and said estimated output from step (g).

61. The method as described in claim 52 wherein said method further includes the use of a smoothing technique.

* * * * *

UNITED STATES PATENT AND TRADEMARK OFFICE
CERTIFICATE OF CORRECTION

PATENT NO. : 6,289,508 B1
DATED : September 11, 2001
INVENTOR(S) : Erickson et al.

It is certified that error appears in the above-identified patent and that said Letters Patent is hereby corrected as shown below:

<u>Column 8,</u>
Line 52, delete "-z(t)" and insert -- z(t) --.

Signed and Sealed this

Twenty-first Day of May, 2002

Attest:

JAMES E. ROGAN
*Director of the United States Patent and Trademark Office*

*Attesting Officer*